Figure 1:
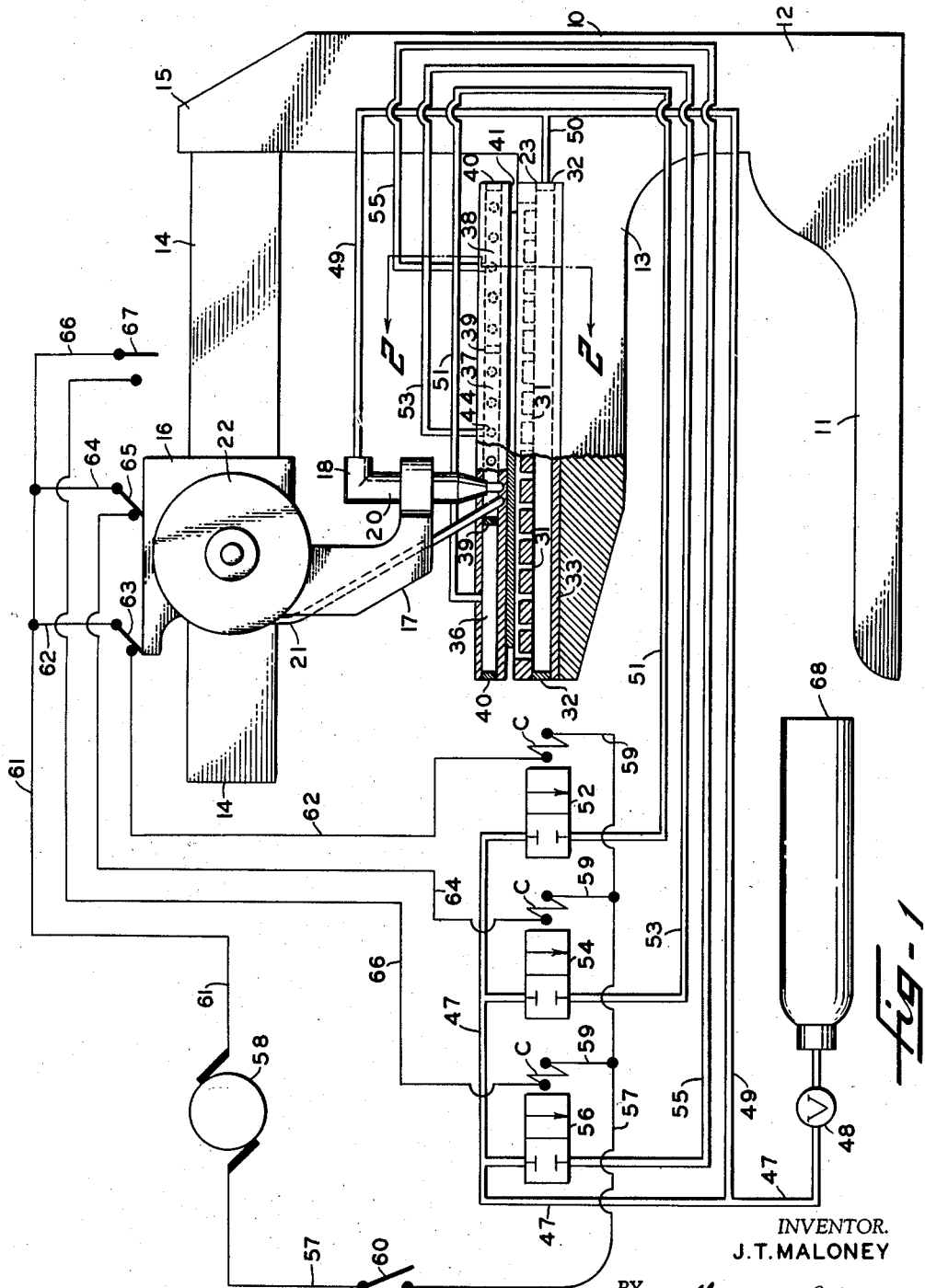

Sept. 16, 1958  J. T. MALONEY  2,852,660
APPARATUS AND METHOD FOR ARC WELDING METAL
Filed Oct. 29, 1957  2 Sheets-Sheet 1

INVENTOR.
J. T. MALONEY
BY George Stell
AGENT

Sept. 16, 1958 J. T. MALONEY 2,852,660
APPARATUS AND METHOD FOR ARC WELDING METAL
Filed Oct. 29, 1957 2 Sheets-Sheet 2

INVENTOR.
J.T.MALONEY
BY George Stell
AGENT

United States Patent Office 2,852,660
Patented Sept. 16, 1958

2,852,660

APPARATUS AND METHOD FOR ARC WELDING METAL

Jack T. Maloney, San Diego, Calif., assignor to Rohr Aircraft Corporation, Chula Vista, Calif., a corporation of California Application October 29, 1957, Serial No. 693,097

8 Claims. (Cl. 219—74)

This invention relates to a method and apparatus for electric arc welding metal and more particularly to a method and apparatus in which the welding operation is performed and the welded metal cooled in an inert atmosphere.

In electric arc welding certain metals it is customary to shield the arc from the ambient atmosphere by completely enveloping it with an inert gas such as helium or argon. This prevents the oxygen and nitrogen in the ambient atmosphere from combining with the molten metal and forming oxides and nitrides which tend to embrittle and weaken the metal and also reduce its resistance to corrosion. Also in arc welding certain metals such as, for example, titanium or zirconium, the oxygen and nitrogen in the atmosphere continue to have an adverse effect on the metal after the welding operation until the metal is cooled to a certain temperature. In these instances it is necessary to shield the weld from the ambient atmosphere until it is sufficiently cool to be unaffected thereby. Various means for shielding the metal during the welding operation and cooling period have been used, such as placing the metal in an enclosure filled with an inert gas, however, such means have been unsatisfactory in that the size of the workpiece is limited by the size of the enclosure and by the difficulty encountered in performing the welding operation therein.

It is, therefore, a primary object of this invention to provide a method and apparatus for electric arc welding metal in which the metal is shielded from the ambient atmosphere during the welding operation and for a sufficient time subsequent thereto to permit the metal to cool.

Another object is to provide a method and apparatus for electric arc welding metal in which an inert gas is used to shield the metal from the ambient atmosphere.

A further object is to provide apparatus for directing a flow of inert gas against the metal in the area thereof being welded and to continue to direct the gas against the metal subsequent to the welding operation until the welded metal is sufficiently cool to be unaffected by the ambient atmosphere.

Another object is to provide apparatus having control means responsive to movement of the arc welder across the metal being welded for controlling and directing the flow of inert gas to the upper surface of the metal.

A further object is to provide apparatus as above described which is of relatively simple and inexpensive construction.

These and other objects and advantages of the invention will become apparent as the description thereof proceeds.

Figure 2:
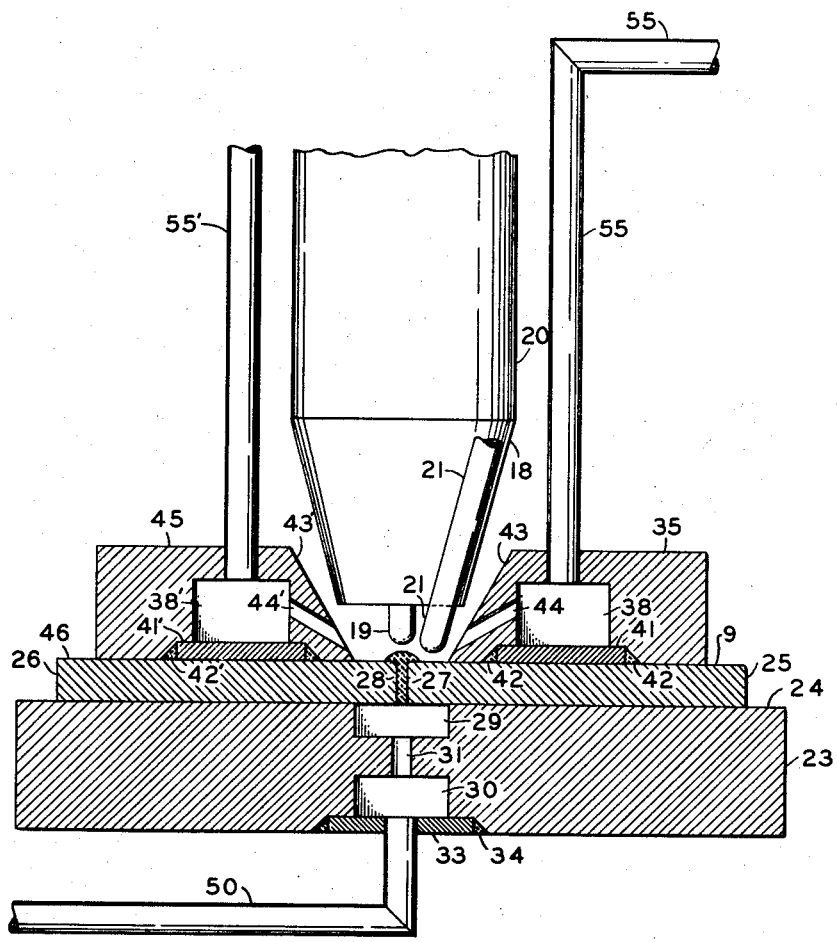

For a better understanding of the invention reference is made to the accompanying drawing illustrating a preferred embodiment thereof and in which:

Fig. 1 is a side elevational view of an electric arc welding apparatus provided with the subject invention partially in section to illustrate its construction and including schematic drawings of the inert gas supply system and the electrically operated gas control system, and Fig. 2 is an enlarged sectional view of the apparatus taken on line 2—2 of Fig. 1.

With reference to the drawing an electric arc welding apparatus 10 of a known type is shown comprising a base 11 having an upright column 12 connected thereto. A workpiece supporting bed 13 is connected to column 12 and projects out over base 11 and a beam 14 is connected to the upper end 15 of column 12 which extends out over bed 13. A carriage 16 is mounted on beam 14 for movement therealong, preferably by a mechanical driving means (not shown), and is provided with a depending portion 17 arranged to support an electric arc welder 18 for movement therewith. Arc welder 18 is of a known type having a non-consumable electrode 19 connected to a source of electrical current (not shown) and contained in a casing 20 through which an inert gas is directed to shield the arc from the ambient atmosphere. A supply of suitable welding rod 21 is contained in a container 22 mounted on carriage 16 and arranged to be fed into the arc produced by arc welder 18 to perform the welding operation. Positioned on bed 13 is a rigid support 23 preferably composed of metal and having an upper surface 24 arranged to support a pair of metal plates 25 and 26 the adjoining edges 27 and 28 of which are to be welded together. While surface 24 is shown as a plane surface it is to be understood that it may be shaped as necessary to support variously shaped workpieces. Support 23 is provided with a slot 29 extending along the length of surface 24 and a channel 30 extending the length of support 23 beneath slot 29 which is connected to channel 30 by a series of openings 31 extending therebetween. Channel 30 is preferably formed in support 23 by machining a slot therein and securing end closures 32 and a bottom closure 33 therein as by welding as indicated at 34. A long rigid bar 35 preferably composed of metal is positioned on the surface 9 of plate 25 adjacent edge 27 thereof and extending the length of plate 25. Bar 35 is provided with a series of cavities 36, 37, and 38 which are preferably formed by machining a slot in bar 35 and securing partitions 39, end closures 40 and a bottom closure 41 therein as by welding as indicated at 42 (Fig. 2). The side 43 of bar 35 adjacent edge 27 is inclined at an acute angle to surface 9 of plate 25 and is provided with a series of openings 44 also extending at an acute angle to surface 9 for a purpose to be explained. A second rigid bar 45 is positioned on the surface 46 of plate 26 along edge 28 thereof which is similar in all respects to bar 35 and for clarity the same reference numbers primed are used to indicate the corresponding parts thereof.

Inert gas such as argon or helium is directed to arc welder 18, support 23 and bar 35 and 45 from a supply tank 68 containing pressurized gas and having an outlet tube 47 provided with a valve 48 connected thereto. A tube 49 connected to tube 47 conveys gas to arc welder 18 to shield the arc produced thereby from the ambient atmosphere and a tube 50 connected to tube 49 extends into channel 30 in support 23 to convey gas thereinto which passes through openings 31 into groove 29 for a purpose to be explained. Tube 50 may be arranged to pass through either end closure 32 as shown in Fig. 1 or through bottom closure 33 as shown in Fig. 2 as is most convenient for installation thereof. Inert gas is conveyed to cavities 36 and 36$^1$ through a tube 51 connected to tube 47 through a control valve 52, the gas passing from cavities 36 and 36$^1$ through openings 44 and 44$^1$ along the length of the cavities to surfaces 9 and 46 of plates 25 and 26 along edges 27 and 28 thereof in a manner and for a purpose to be explained. Gas is conveyed to cavities 37 and 37$^1$ through a tube 53 connected to tube 47 through a control valve 54 and to cavities 38 and 38¹ through a tube 55 connected to tube 47 through a control valve 56. With reference to Fig. 2 of the drawing tube 55 is shown connected to bar 25 to direct a stream of inert gas into cavity 38 and a tube 55¹ is connected to bar 45 to convey gas into cavity 38¹, tube 55¹ being connected to tube 55 at a remote point (not shown) to direct gas to both cavities 38 and 38¹ simultaneously. Tubes 51 and 53 are provided with similar connecting tubes (not shown) to direct gas to cavities 36 and 36¹ and cavities 37 and 37¹ in the same manner. Control valves 52, 54 and 56 are alike in all respects and are normally closed, solenoid operated valves of a known type, each being provided with a coil C which, when energized, causes the valves to move to an open position.

With reference to Fig. 1 of the drawing the electrical system through which coils C are energized to actuate valves 52, 54 and 56 comprises a line 57 connected to a source of electrical current 58 to which one side of each of coils C is connected by means of leads 59, line 57 being provided with a manually operated switch 60. A second line 61 is connected to source 58 to which the other side of coil C of valve 52 is connected by a lead 62 having a contact switch 63 therein. Coil C of valve 54 has its other side connected to line 61 by means of a lead 64 having a contact switch 65 therein and coil C of valve 56 is connected to line 61 by a lead 66 having a contact switch 67 therein. Switches 63, 65 and 67 are normally open and are arranged to be closed by carriage 16 coming into contact therewith as the carriage moves along beam 14 during the welding operation.

To perform a welding operation with the above described apparatus plates 25 and 26 are placed on support 23 with the edges 27 and 28 thereof in abutting positions directly over slot 29. Bars 35 and 45 are placed on upper surfaces 9 and 46 of plates 25 and 26 with faces 43 and 43¹ thereof positioned along edges 27 and 28. Carriage 16 is positioned at the end of beam 14 adjacent end 15 of upright 12 in which position switch 67 is in contact with and held in a closed position thereby. Valve 48 is opened allowing gas to flow from tank 68 to arc welder 18, valves 52, 54 and 56, into channel 30, the gas directed into channel 30 flowing upward through openings 31 into slot 29 forcing the air therefrom and thus shielding the lower surface of plates 25 and 26 along edges 27 and 28 from the ambient atmosphere. Switch 60 is closed permitting current to flow through line 57 thereby completing the circuit to coil C of valve 56, switch 67 being closed, causing valve 56 to open and allow gas to flow through tube 55 to cavities 38 and 38¹. The gas directed into cavities 38 and 38¹ passes out through openings 44 and 44¹ into the area between sides 43 and 43¹ of bars 35 and 45 along the length of cavities 38 and 38¹. The openings being inclined at an acute angle to surfaces 9 and 46 causes the gas emerging therefrom to impinge on surfaces 9 and 46 along edges 27 and 28 and be deflected upward along sloping sides 43 and 43¹ to thereby force the air from between sides 43 and 43¹ and fill the area with inert gas. This provides surfaces 9 and 46 along edges 27 and 28 with an effective shield against the ambient atmosphere along the length of cavities 38 and 38¹. Current is directed to arc welder 18 to produce an arc between plates 25 and 26 and electrode 19 into which rod 21 is fed to weld edges 27 and 28 together as arc welder 18 is moved therealong by movement of carriage 16 along beam 14. As carriage 16 moves along beam 14 it comes into contact with and closes switch 65 prior to arc welder 18 reaching the portions of edges 27 and 28 which are positioned opposite cavities 37 and 37¹. The circuit to coil C of valve 54 having been completed by the closing of switch 65 valve 54 is opened to permit gas to flow through tube 53 into cavities 37 and 37¹ and out through openings 44 and 44¹ in the manner above described in connection with cavities 38 and 38¹. Thus, as arc welder 18 reaches the portions of edges 27 and 28 positioned opposite cavities 37 and 37¹ the area therealong between the sides 43 and 43¹ is already filled with inert gas to shield the metal from the ambient atmosphere during the welding operation. As arc welder 18 passes along the portion of edges 27 and 28 positioned opposite cavities 37 and 37¹ carriage 16 remains in contact with switch 65 holding it closed so that gas continues to flow through valve 56 and tube 55 into cavities 38 and 38¹ and out through openings 44 and 44¹ along the completed weld to shield the hot welded metal from the atmosphere. Switch 67 is so positioned that when sufficient time has elapsed to permit the welded metal to cool to a temperature at which the metal is not adversely affected by the ambient atmosphere, carriage 16 will have moved a sufficient distance along beam 14 to release switch 67 allowing it to open and break the circuit to coil C of valve 56 thereby closing the valve to stop the flow of gas to cavities 38 and 38¹. As carriage 16 continues to move along beam 14 it comes into contact with and closes switch 63 prior to arc welder 18 reaching the portions of edges 27 and 28 positioned opposite cavities 36 and 36¹. The circuit to coil C of valve 56 being completed the valve is opened to permit gas to flow through openings 44 and 44¹ in the manner previously described in connection with cavities 37 and 37¹. Thus as arc welder reaches the portions of edges 27 and 28 positioned opposite cavities 36 and 36¹ the area therealong between sides 43 and 43¹ is already filled with insert gas to shield the metal from the ambient atmosphere during the welding operation. As arc welder 18 passes along the portions of edges 27 and 28 positioned opposite cavities 36 and 36¹ carriage 16 remains in contact with switch 65 holding it closed so that gas continues to flow through valve 54 into cavities 37 and 37¹ and out through openings 44 and 44¹ along the completed weld to shield the hot welded metal from the ambient atmosphere. Switch 65 is so positioned that when sufficient time has elapsed to permit the welded metal to cool to a temperature at which the metal is not adversely affected by the ambient atmosphere, carriage 16 will have moved a sufficient distance along beam 14 to release switch 65 allowing it to open and break the circuit to coil C of valve 54 thereby closing the valve to stop the flow of gas to cavities 37 and 37¹. When the welding operation is completed along the portions of edges 27 and 28 positioned opposite cavities 36 and 36¹ the flow of current to electrode 19 is stopped and carriage 16 is stopped in a position to hold switch 63 closed so that gas continues to flow into cavities 36 and 36¹ to shield the hot welded metal from the atmosphere until it is sufficiently cool to be unaffected thereby. When the welded metal opposite cavities 36 and 36¹ has cooled sufficiently valve 48 is closed to stop the flow of gas to the apparatus and switch 60 is opened to break the circuits to coils C so that all of the valves are closed. In the above described operation it may be seen that the metal is entirely shielded from the ambient atmosphere along the portion thereof being welded during the welding operation and subsequent thereto until the welded metal has cooled sufficiently to be unaffected by the ambient atmosphere. This results in a weld that is substantially free from nitrides, oxides and other elements which tend to weaken the weld and lessen its resistance to corrosion. It is to be understood that the above described apparatus and method is not limited to the use of an arc welder such as that described but that various types of known welders may be used with equal success. Also, bars 35 and 45 are not limited as to their shape, size or the number of cavities provided therein but may be arranged and adapted for use on workpieces of varied shapes and sizes.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In combination with an apparatus for electric arc welding metal, means for shielding the metal from the ambient atmosphere during the welding operation and subsequent thereto until the welded metal has cooled, comprising: a rigid support adapted to support the metal to be welded, said support being arranged and constructed to receive a stream of inert gas and to discharge the gas against the lower surface of the metal along the portion thereof to be welded; a pair of long rigid members disposed on the upper surface of the metal in spaced apart positions and extending along each side of the area of the metal to be welded, each of said members being provided with a cavity arranged to receive a stream of intert gas and a plurality of openings communicating with said cavity, said openings being arranged to discharge gas from within said cavity against the upper surface of the metal in the area being welded and along the completed weld adjacent thereto; means for directing a stream of inert gas into said cavities; and means for controlling the flow of said stream of inert gas to said cavities.

2. In combination with an apparatus for electric arc welding metal, means for shielding the metal from the ambient atmosphere during the welding operation and subsequent thereto until the welded metal has cooled, comprising: a rigid support adapted to support the metal to be welded, said support being arranged and constructed to receive a stream of inert gas and to discharge the gas against the lower surface of the metal along the portion thereof to be welded; a rigid member disposed along the upper surface of said metal adjacent the portion thereof to be welded, said rigid member being provided with a plurality of cavities along the length thereof, each of said cavities being arranged to receive a stream of inert gas, and a plurality of openings communicating with each of said cavities, said openings being arranged to direct inert gas from within said cavities against the surface of the metal in the area being welded and along the completed weld adjacent thereto; means for conveying a stream of inert gas into each of said cavities; and means for selectively directing the flow of inert gas to each of said cavities.

3. In combination with an apparatus for electric arc welding metal, means for shielding the metal from the ambient atmosphere during the welding operation and subsequent thereto until the welded metal has cooled comprising: a rigid support adapted to support the metal to be welded, said support being arranged and constructed to receive a stream of inert gas and to discharge the gas against the lower surface of the metal along the portion thereof to be welded; a pair of rigid members disposed on the upper surface of said metal in spaced apart positions along both sides of the portions of the metal to be welded, said rigid members being provided with a plurality of cavities along the length thereof, each cavity being arranged to receive a stream of inert gas, and a plurality of openings communicating with each of said cavities, said openings being arranged to direct inert gas from within said cavities against the upper surface of the metal along the portions thereof to be welded and means for selectively conveying a stream of inert gas to each of said cavities.

4. In combination with an apparatus for electric arc welding having an arc welder mounted thereon for guided movement along the surface of the metal, means for shielding the metal from the ambient atmosphere during the welding operation and subsequent thereto until the welded metal has cooled, comprising: a support adapted to support the metal to be welded, said support being arranged and constructed to receive a stream of inert gas and to discharge the gas against the lower surface of the metal along the portions thereof to be welded; means disposed along the upper surface of the metal adjacent the portions thereof to be welded arranged and constructed to receive a stream of inert gas and to direct the gas against the upper surface of the metal in the area thereof being welded and along the completed weld adjacent thereto; and means responsive to movement of said arc welder for controlling the flow of inert gas to the upper surface of the metal.

5. In combination with an apparatus for electric arc welding metal having an arc welder mounted for guided movement along the surface of the metal, means for shielding the metal from the ambient atmosphere during the welding operation and subsequent thereto until the welded metal has cooled comprising: a support adapted to support the metal to be welded, said support being arranged and constructed to receive a stream of inert gas and to discharge the inert gas against the lower surface of the metal along the portions thereof to be welded; a rigid member disposed along the upper surface of the metal adjacent the portions thereof to be welded, said member being provided with a plurality of cavities each of said cavities being arranged to receive a stream of inert gas and a plurality of openings extending into each of said cavities said openings being arranged to discharge gas from within said cavities against the upper surface of the metal in the area being welded and along the completed weld adjacent thereto; means for conveying inert gas into said cavities; and means responsive to movement of said arc welder for directing inert gas into selected cavities.

6. In combination with an apparatus for electric arc welding metal having an arc welder mounted for guided movement along the surface of the metal, means for shielding the metal from the ambient atmosphere during the welding operation and subsequent thereto until the welded metal has cooled, comprising: a support adapted to support the metal to be welded, said support being arranged and constructed to receive a stream of inert gas and to discharge the gas against the lower surface of the metal along the portions thereof to be welded; means disposed on the upper surface of the metal along each side and adjacent to the portions of the metal to be welded arranged to receive a stream of inert gas and to discharge the gas against the upper surface of the metal in the area being welded and along a portion of the completed weld adjacent thereto; and means responsive to movement of said arc welder for controlling the flow of inert gas to the upper surface of the metal.

7. In combination with an apparatus for electric arc welding metal having an electric arc welder mounted for guided movement along the surface of the metal, means for shielding the metal from the ambient atmosphere during the welding operation and subsequent thereto, comprising: a support adapted to support the metal to be welded said support being arranged and constructed to receive a stream of inert gas and to discharge the gas against the lower surface of the metal along the portions thereof to be welded; a pair of rigid members disposed on the upper surface of the metal in spaced apart positions along both sides of the portions of the metal to be welded, each of said members being provided with a plurality of cavities along the length thereof, each cavity being arranged to receive a stream of inert gas, and a plurality of openings extending into each of said cavities said openings being arranged to direct gas from within said cavities against the upper surface of the metal along the portions thereof to be welded; means for conveying a stream of inert gas into said cavities; and means responsive to movement of said arc welder for directing a stream of inert gas into selected cavities.

8. In combination with an apparatus for electric arc welding metal having an arc welder mounted for guided movement along the surface of the metal, means for shielding the metal from the ambient atmosphere during the welding operation and subsequent thereto until the welded metal has cooled, comprising: a rigid support arranged to support the metal to be welded, said support being provided with a channel extending the length thereof adapted to receive a stream of inert gas, a groove extending along the upper surface thereof and a plurality of openings extending between said channel and said groove arranged to discharge gas from within said channel into said groove and against the lower surface of the metal; a pair of long rigid members disposed on the upper surface of the metal in spaced apart positions and extending along each side and adjacent to the portions of the metal to be welded, said members being provided with a series of adjoining cavities along the length thereof, each cavity being arranged to receive a stream of inert gas, and a plurality of openings extending into each of said cavities said openings being arranged to direct inert gas from within said cavities against the upper surface of the metal in the area being welded and along a portion of the completed weld adjacent thereto; means for conveying inert gas into said cavities; and means responsive to movement of said arc welder for directing inert gas to selected cavities.

References Cited in the file of this patent

UNITED STATES PATENTS

| | | |
|---|---|---|
| 1,969,840 | Goddard | Aug. 14, 1934 |
| 2,644,070 | Herbst | June 30, 1953 |
| 2,804,885 | Mott | Sept. 3, 1957 |